United States Patent
Arafa et al.

(10) Patent No.: US 10,095,618 B2
(45) Date of Patent: Oct. 9, 2018

(54) MEMORY CARD WITH VOLATILE AND NON VOLATILE MEMORY SPACE HAVING MULTIPLE USAGE MODEL CONFIGURATIONS

(71) Applicant: Intel Corporation, Santa Clara, CA (US)

(72) Inventors: Mohamed Arafa, Chandler, AZ (US); Raj K. Ramanujan, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/952,692

(22) Filed: Nov. 25, 2015

(65) Prior Publication Data

US 2017/0147490 A1    May 25, 2017

(51) Int. Cl.
| | | |
|---|---|---|
| *G06F 12/00* | (2006.01) | |
| *G06F 12/0804* | (2016.01) | |
| *G06F 12/12* | (2016.01) | |
| *G06F 12/02* | (2006.01) | |
| *G06F 12/0866* | (2016.01) | |

(52) U.S. Cl.
CPC ...... *G06F 12/0804* (2013.01); *G06F 12/0246* (2013.01); *G06F 12/0866* (2013.01); *G06F 12/12* (2013.01); *G06F 2212/1032* (2013.01); *G06F 2212/7202* (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 5,912,839 A | 6/1999 | Ovshinsky et al. | |
| 7,093,089 B2* | 8/2006 | de Brebisson | G06F 11/1441 711/103 |
| 7,464,240 B2* | 12/2008 | Caulkins | G06F 3/0616 711/103 |
| 7,590,918 B2 | 9/2009 | Parkinson | |
| 7,600,078 B1 | 10/2009 | Cen et al. | |
| 7,756,053 B2 | 7/2010 | Thomas et al. | |
| 7,913,147 B2 | 3/2011 | Swaminathan et al. | |
| 8,051,253 B2 | 11/2011 | Okin et al. | |
| 8,462,537 B2 | 6/2013 | Karpov et al. | |
| 8,462,577 B2 | 6/2013 | Zeng et al. | |

(Continued)

OTHER PUBLICATIONS

Lee et al., "Architecting Phase Change Memory as a Scalable DRAM Alternative", ISCA '09, Jun. 20, 2009, 12 pgs., Austin, Texas, USA.

(Continued)

*Primary Examiner* — Brian Peugh
(74) *Attorney, Agent, or Firm* — Compass IP Law PC

(57) ABSTRACT

An apparatus is described that includes a memory card. The memory card also includes volatile memory devices. The memory card also includes non volatile memory devices. The memory card is configurable to implement a first portion of the storage space of the non volatile memory devices as system memory. The memory card also includes a controller to manage, upon a power down event, the transfer of information from the volatile memory devices into a second portion of the storage space of the non volatile memory devices.

18 Claims, 7 Drawing Sheets

(56) References Cited

U.S. PATENT DOCUMENTS

| | | | |
|---|---|---|---|
| 8,463,948 B1 | 6/2013 | Qawami et al. | |
| 8,612,676 B2 | 6/2013 | Dahlen et al. | |
| 8,605,531 B2 | 12/2013 | Kau et al. | |
| 8,607,089 B2 | 12/2013 | Qawami et al. | |
| 8,612,809 B2 | 12/2013 | Casper et al. | |
| 8,626,997 B2 | 1/2014 | Qawami et al. | |
| 8,649,212 B2 | 2/2014 | Kau et al. | |
| 8,838,935 B2 | 9/2014 | Hinton | |
| 8,914,594 B2* | 12/2014 | Yerushalmi | G06F 3/0625 711/103 |
| 9,342,453 B2 | 5/2016 | Nale et al. | |
| 9,378,133 B2 | 6/2016 | Nachimuthu et al. | |
| 9,430,372 B2 | 8/2016 | Nachimuthu et al. | |
| 2007/0005922 A1 | 1/2007 | Swaninathan et al. | |
| 2008/0016269 A1 | 1/2008 | Chow et al. | |
| 2008/0034148 A1 | 2/2008 | Gower | |
| 2008/0082766 A1 | 4/2008 | Okin et al. | |
| 2008/0270811 A1 | 10/2008 | Chow et al. | |
| 2009/0313416 A1 | 12/2009 | Nation | |
| 2010/0110748 A1 | 5/2010 | Best | |
| 2010/0131827 A1 | 5/2010 | Sokolov | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0153916 A1 | 6/2011 | Chinnaswamy et al. | |
| 2011/0208900 A1 | 8/2011 | Schuette et al. | |
| 2011/0291884 A1 | 12/2011 | Oh et al. | |
| 2013/0166819 A1* | 6/2013 | Yerushalmi | G06F 3/0625 711/103 |
| 2013/0275661 A1 | 10/2013 | Zimmer et al. | |
| 2013/0282967 A1 | 10/2013 | Ramanujan | |
| 2013/0290597 A1 | 10/2013 | Faber | |
| 2014/0040550 A1 | 2/2014 | Nale et al. | |
| 2014/0129767 A1 | 5/2014 | Ramanujan et al. | |
| 2014/0297938 A1 | 10/2014 | Puthiyedath et al. | |
| 2015/0046625 A1* | 2/2015 | Peddle | G11C 16/10 710/308 |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

"Datacenter Memory and Storage—Past, Present, Future", Moor Insights & Strategy, 2015 Moor Insights & Strategy, 37 pages.

Gallagher, Sean, "Memory that never forgets: non-volatile DIMMS hit the market", ARS Technica, Apr. 4, 2013, 3 page.

* cited by examiner

MEMORY CARD WITH VOLATILE AND NON VOLATILE MEMORY SPACE HAVING MULTIPLE USAGE MODEL CONFIGURATIONS

FIELD OF INVENTION

The field of invention pertains generally to the computing sciences, and, more specifically, to a memory card with volatile and non volatile memory space having multiple usage model configurations.

BACKGROUND

Computing systems typically include system memory (or main memory) that contains data and program code of the software code that the system's processor(s) are currently executing. A pertinent bottleneck in many computer systems is the system memory. Here, as is understood in the art, a computing system operates by executing program code stored in system memory. The program code when executed reads and writes data from/to system memory. As such, system memory is heavily utilized with many program code and data reads as well as many data writes over the course of the computing system's operation.

Finding ways to improve system memory performance and/or versatility is therefore a motivation of computing system engineers.

FIGURES

A better understanding of the present invention can be obtained from the following detailed description in conjunction with the following drawings, in which.

DETAILED DESCRIPTION

Traditionally, system memory has been implemented with volatile DRAM memory chips. A problem with traditional volatile system memory is that current program state or context (i.e., the values of a computer program's internal variables) is entirely lost in the case of a sudden power failure.

Figure 1:
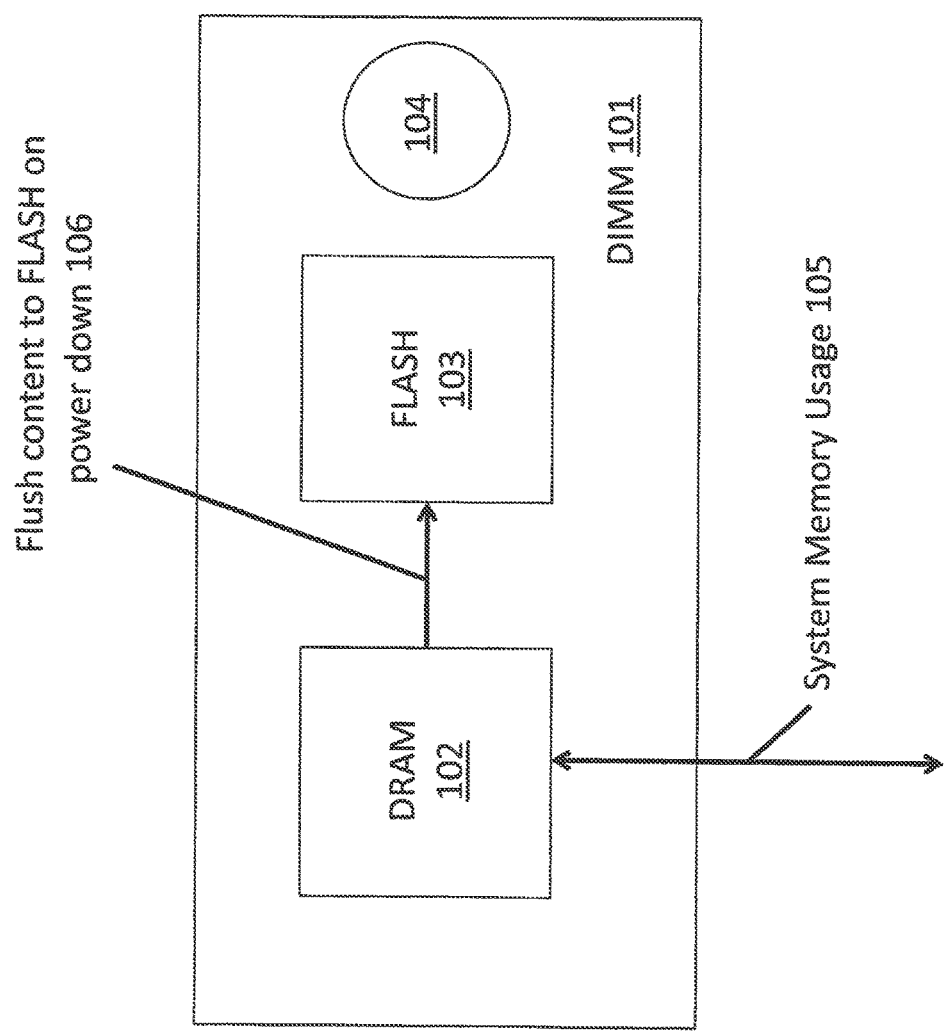
FIG. 1 shows a prior art NVDIMM-N card.

A new kind of system memory technology, depicted in FIG. 1 and referred to as NVDIMM-N, disposes both volatile DRAM memory chips 102 and non volatile FLASH memory chips 103 on a same DIMM card 101. Under normal operation the system operates out of the DRAM memory chips 102 so the system enjoys the faster performance of DRAM. However, in the case of a sudden power failure, the DIMM card 101 has a power storage unit 104 that can hold the DIMM card's electrical power for a long enough time period to permit the content of the DRAM memory devices 102 to be transferred into the FLASH memory devices 103. As such, the system's software execution state at the moment of the power outage is preserved and not lost in response to the power down event.

Figure 2:
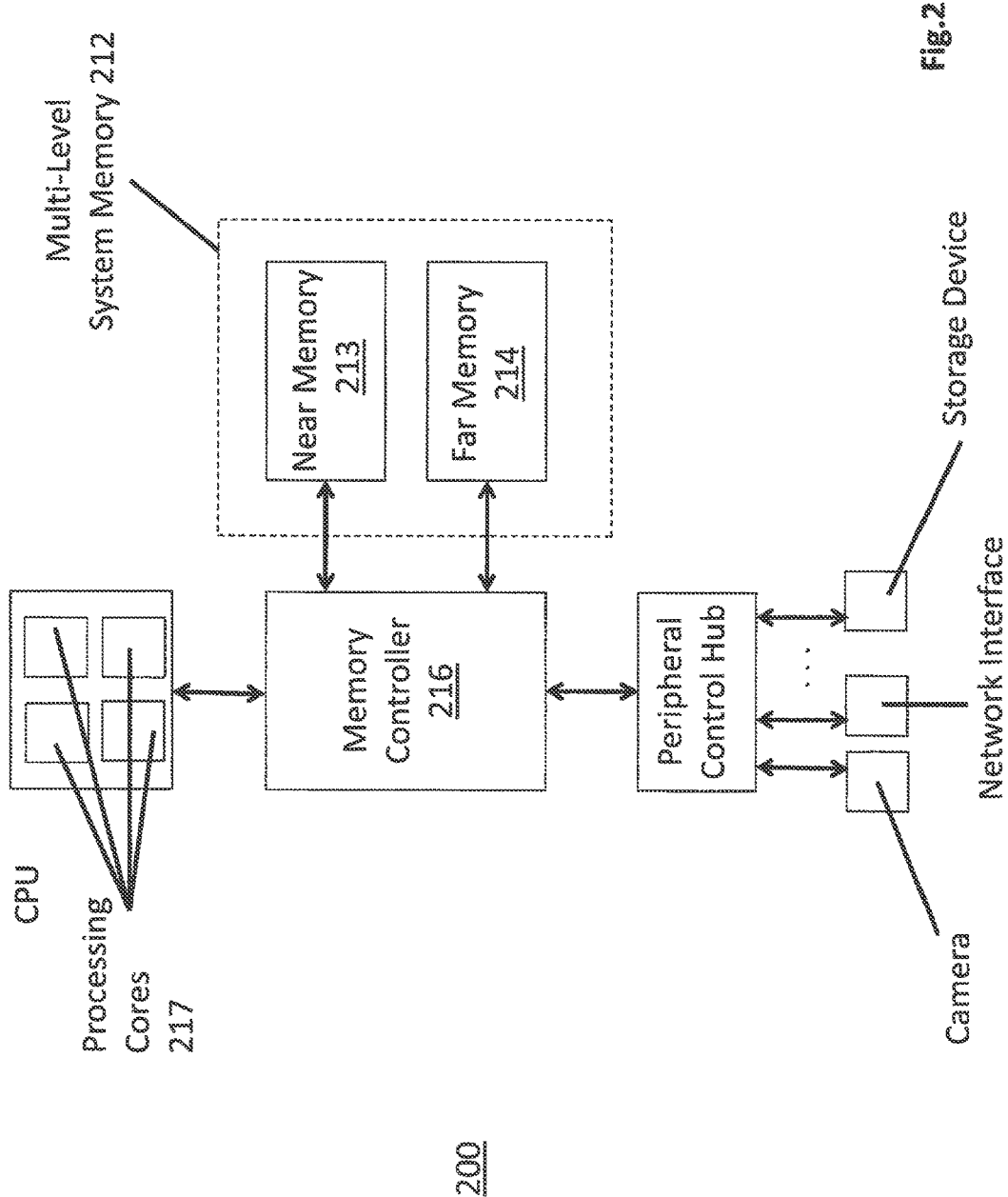
FIG. 2 shows a computing system having a multi-level system memory.

One of the ways to improve system memory performance and/or versatility without significantly increasing power consumption is to have a multi-level system memory. FIG. 2 shows an embodiment of a computing system 100 having a multi-tiered or multi-level system memory 212. According to various embodiments, a faster near memory 213 may be utilized as a memory side cache.

In the case where near memory 213 is used as a memory side cache, near memory 213 is used to store data items that are expected to be more frequently called upon by the computing system. The near memory cache 213 has lower access times than the lower tiered far memory 214 region. By storing the more frequently called upon items in near memory 213, the system memory 212 will be observed as faster because the system will often read items that are being stored in faster near memory 213.

According to some embodiments, for example, the near memory 213 exhibits reduced access times by having a faster clock speed than the far memory 214. Here, the near memory 213 may be a faster, volatile system memory technology (e.g., high performance dynamic random access memory (DRAM)) or faster non volatile memory. By contrast, far memory 214 may be either a volatile memory technology implemented with a slower clock speed (e.g., a DRAM component that receives a slower clock) or, e.g., a non volatile memory technology that is inherently slower than volatile/DRAM memory or whatever technology is used for near memory.

For example, far memory 214 may be comprised of an emerging non volatile byte addressable random access memory technology such as, to name a few possibilities, a three dimensional crosspoint memory, a phase change based memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Such emerging non volatile random access memories technologies can have some combination of the following: 1) higher storage densities than DRAM (e.g., by being constructed in three-dimensional (3D) circuit structures (e.g., a three dimensional crosspoint circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits an emerging non volatile memory technology to be used in a main system memory role rather than a traditional mass storage role (which is the traditional architectural location of non volatile storage).

Regardless of whether far memory 214 is composed of a volatile or non volatile memory technology, in various embodiments far memory 214 acts as a system memory in that it supports finer grained data accesses (e.g., cache lines) rather than larger sector based accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of.

Because near memory 213 can act as a cache, near memory 213 may not have its own individual addressing space. Rather, only far memory 214 includes the individually addressable memory space of the computing system's main memory. In various embodiments near memory 213 acts as a cache for far memory 214 rather than acting a last level CPU cache. Generally, a CPU level cache is able to keep cache lines across the entirety of system memory addressing space that is made available to the processing cores 217 that are integrated on a same semiconductor chip as the memory controller 216. Additionally a CPU level cache only receives entries after a higher level cache evicts content that is pushed down to the CPU level cache. By contrast, a memory side cache can receive entries as a consequence of what is being called up from system memory rather than only receiving entries as a consequence of a higher level cache evictions.

For example, in various embodiments, system memory is implemented with dual in-line memory module (DIMM) cards where a single DIMM card has both DRAM and (e.g., emerging) non volatile memory chips disposed in it. The DRAM chips effectively act as an on board cache for the non volatile memory chips on the DIMM card. The more frequently accessed cache lines of any particular DIMM card can be found on that DIMM card's DRAM chips rather than its non volatile memory chips. Given that multiple DIMM cards are typically plugged into a working computing system and each DIMM card is only given a section of the system memory addresses made available to the processing cores 117 of the semiconductor chip that the DIMM cards are coupled to, the DRAM chips are acting as a cache for the non volatile memory that they share a DIMM card with rather than a last level CPU cache.

In other configurations, DIMM cards having only DRAM chips may be plugged into a same system memory channel (e.g., a DDR channel) with DIMM cards having only non volatile system memory chips. In some cases, the more frequently used cache lines of the channel will be found in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache.

In yet other possible configurations or implementations, a DRAM device on a DIMM card can act as a memory side cache for a non volatile memory chip that resides on a different DIMM and is plugged into a different channel than the DIMM having the DRAM device. Although the DRAM device may potentially service the entire system memory address space, entries into the DRAM device are based in part from reads performed on the non volatile memory devices and not just evictions from the last level CPU cache. As such the DRAM device can still be characterized as a memory side cache.

In yet other embodiments, near memory 213 may act as a CPU level cache rather than a memory side cache, and/or, may be allocated with its own system memory addressing space to effectively behave, e.g., as a higher priority region of system memory (e.g., more important data is put in the faster near memory addressing space of system memory).

Although the above examples referred to packaging solutions that included DIMM cards, it is pertinent to note that this is just one example and other embodiments may use other packaging solutions. For example, to name just a few, stacked chip technology (e.g., one or both of DRAM and non volatile memory stacked on a large system-on-chip having multiple CPU cores and a main memory controller, etc.), one or more DRAM and non volatile memories integrated on a same semiconductor die or at least within a same package as a CPU die containing processing core(s) (e.g., in a multi-chip module, etc.).

Figure 3:
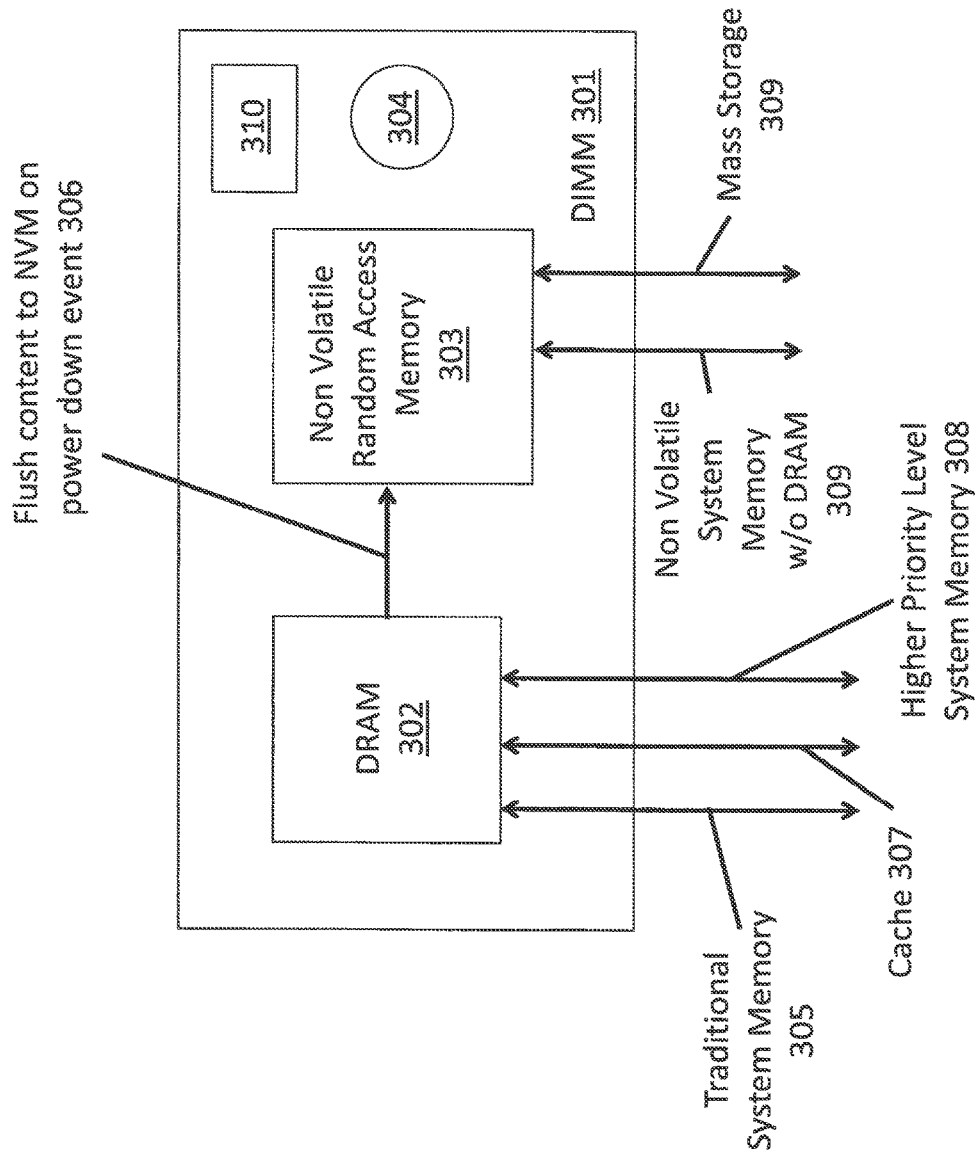
FIG. 3 shows an improved DIMM card.

FIG. 3 shows an improved DIMM card 301 that can be used as a direct replacement for a FLASH based NVDIMM-N card (such as the NVDIMM-N card discussed earlier with respect to FIG. 1) in, e.g., a traditional computing system that does not have a multi-level system memory. Additionally, as described in more detail further below, the improved DIMM card 301 of FIG. 3 can support a number of additional uses/functions beyond just DRAM backup protection that are suitable in a multi-level system memory computer.

As observed in FIG. 3, the improved DIMM card 301 includes DRAM memory devices 302 and non volatile random access memory devices 303 such as any of the far memory technologies discussed just above with respect to FIG. 2. In an embodiment, the improved DIMM card 301 of FIG. 3 can be placed in a first mode 305 that, like the NVDIMM-N solution 101 described earlier, uses the DRAM devices 302 as system memory. Additionally, again as with the NVDIMM-N solution, the improved DIMM 301 also includes power storage circuitry 304 (e.g., a capacitance and/or a modest lifetime battery) and an ability to move 306 or copy its DRAM content into the non volatile memory devices 303 upon an unexpected or expected power down event. In alternate embodiments, the power storage circuitry may exist off the DIMM.

In the case where the power down event is unexpected, in various implementations, the power storage circuitry 304 need not be as sophisticated or expensive or otherwise hold as much power as the power storage circuitry of a standard NVDIMM-N solution. Here, because of a faster data path that exists between the DRAM devices 302 and the non volatile memory devices 303 on the improved DIMM card 301 (explained in more detail below), it is conceivable that information can be transferred from the DRAM devices 302 into the non volatile memory devices 303 more quickly than an NVDIMM-N solution. Because less time is needed to save the DRAM information, the improved DIMM card 301 may require less sophisticated power storage circuitry 304 as a consequence.

As alluded to above, the improved DIMM 301 also supports additional operational modes at least some of which may be used in a multi-level system memory (such as the multi-level system memory system described just above with respect to FIG. 2) which a NVDIMM-N solution does not contemplate.

A first multi-level system memory mode includes the DRAM devices 302 acting as a memory side cache 307 for the non volatile memory devices 303 that are disposed on the same DIMM 301. Here, as described at length above, the DRAM memory 302 on the DIMM 301 will receive entries, at least in part, based on what the system is requesting from the system memory devices on the DIMM 301. As such, to the extent the DIMM card 301 has system memory address space allocated to it, the DRAM devices 302 should regularly contain the information of many of the most frequently or most recently called upon addresses within the allocated address space.

A pertinent feature of the first multi-level system memory mode is that the contents of the DRAM based memory side cache 302 can be preserved in the case of a power down event. That is, in the case of an unexpected or expected power down, the contents of the DRAM devices 302 can be transferred to the non volatile memory devices 303 according to the same procedures described at length above.

However, because the DRAM devices 302 are acting as a memory side cache, the saving of the DRAM state corresponds to the saving of a memory side cache state. In implementations where the DRAM near memory acts as a write back cache to the far memory non volatile memory devices, the saving of the DRAM contents will often save the most recent data for a number of the system memory addresses that are assigned to the DIMM card 301.

Additionally, the capacity of the non volatile memory devices 303 in various embodiments exceeds the capacity of the DRAM devices 302 on the DIMM. Here, DRAM cache 302 is able to only cache a smaller percentage of the total address space capacity of the non volatile memory devices 303. As such, during normal operation, there is live system memory data in the non volatile memory devices 303 and only a percentage of this data is receiving cache support from the DRAM devices 302. Thus, during a power down event, the data kept in the non volatile memory devices 303 that is not being cached does not need to be backed up because it is being kept in non volatile system memory. In this fashion, the DIMM 301 is able to keep its entire system memory state, a percentage of which is not cached and is inherently saved by the non volatile memory 303 it is stored in, and, another percentage of which is transferred from the DRAM based cache 302 to the non volatile memory devices 303.

Figure 4:
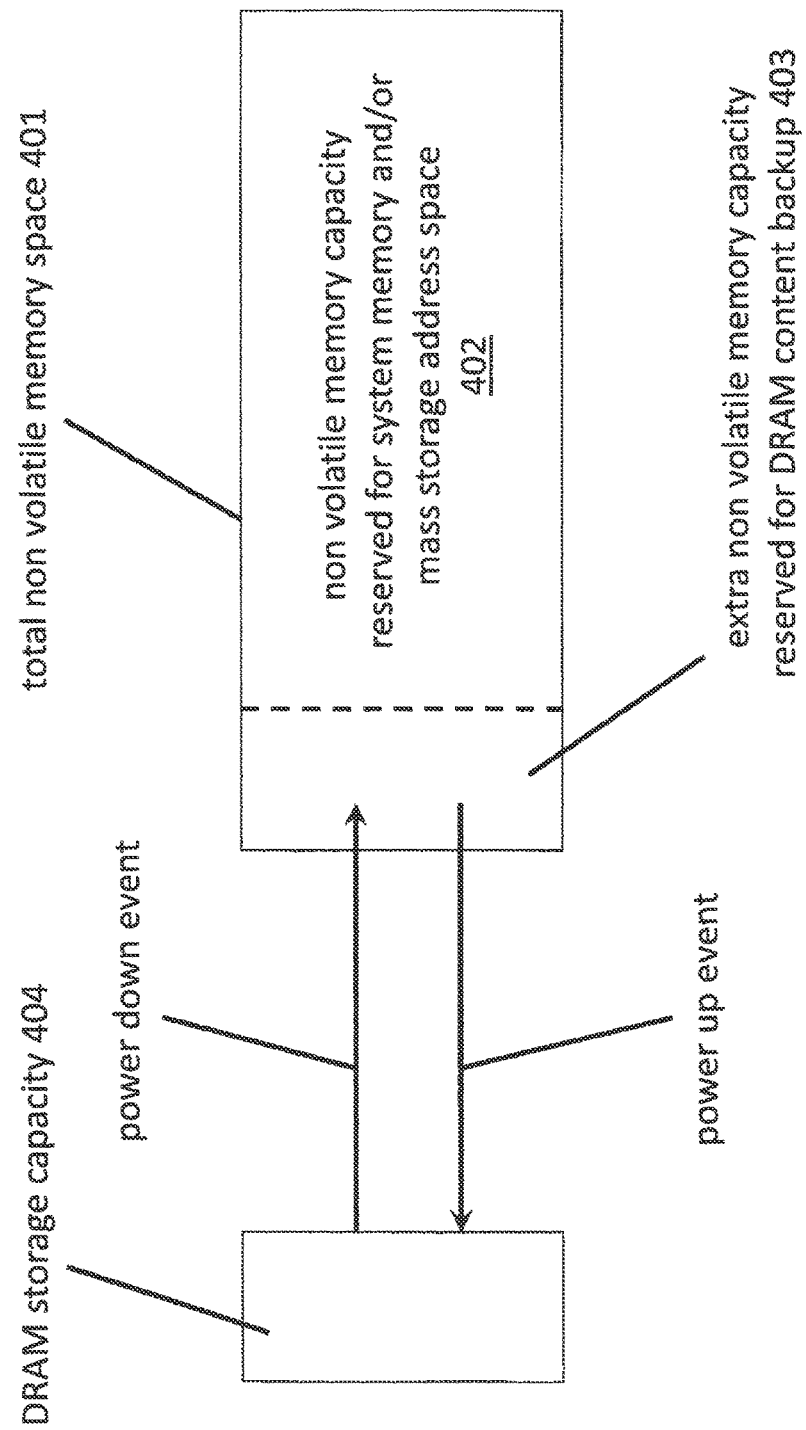
FIG. 4 shows additional non volatile memory space on a DIMM card that is reserved for saving DRAM state information.

In an embodiment, as observed in FIG. 4, there exists extra non volatile memory storage capacity 403 in the total non volatile memory capacity 401 to keep the DRAM state during a power down event. In this case, the DRAM content is not written over its sibling data that is stored in the allocated non volatile memory space 402. That is, if the DRAM devices are acting as a cache for various cache lines kept in the non volatile memory devices, the versions of the cache lines that are kept in the non volatile memory devices are not written over when the DRAM state is saved (separate, additional non volatile memory space 403 is reserved for saving the DRAM state). Thus, when power is restored, the saved contents of the DRAM state are booted back into the DRAM devices which restores the state of the cache just prior to the power down.

In another embodiment, the DRAM data is written over the corresponding cache lines in the non volatile memory space 402. In this case, any additional non volatile memory space is not utilized (or may not exist in favor of additional far address space allocation).

In a second multi-level mode, referring back to FIG. 3, the DRAM devices do not act as a near memory cache but are instead allocated their own respective system memory addressing space that is different than the system memory addressing space allocated to the non volatile memory devices. Here, for instance, the DRAM devices may correspond to a higher priority memory level 308 than the memory level that the non volatile memory devices 303 correspond to. As discussed with respect to FIG. 4, in an embodiment, there is extra capacity in the non volatile memory devices 303 that is not allocated for system memory but is instead reserved as the storage area for the content of the DRAM memory devices 302 upon a power down event. After a subsequent power on and boot-up, the contents of the reserved non volatile area are loaded back into the DRAM memory devices 302 to restore the state of the higher priority memory level. The state of the lower priority non volatile memory level was inherently saved because of its non volatility.

The improved DIMM 301 in various embodiments also supports a non volatile system memory mode 309 in which the DRAM devices 302 are not used and only the non volatile memory devices are used as system memory. In this case the DIMM 301 is used to support, e.g., the operation of a computing system in which only emerging non volatile memory devices are used as the main memory of the computing system without a near memory or memory side cache. Depending on the type of computing system the DIMM 301 is plugged into, a memory side cache may or may not exist elsewhere outside the DIMM 301 for the non volatile memory devices 303 on the DIMM or for other non volatile memories on other DIMMs. In at least one possible configuration, however, there is no memory side cache and the primary main memory of the system is implemented with non volatile memory devices.

In another mass storage mode of operation, again, the DRAM devices 302 are not used and the non volatile memory devices 303 are used as mass storage (e.g., akin to a solid state disk (SDD) device). Here, sectors of information are written into the non volatile memory devices 303 rather than cache lines (which are the primary data structure for system memory). In an extended embodiment, the DRAM devices 302 may act as a local cache for the mass storage non volatile memory devices 303.

The improved DIMM card 301 may support any/all of the aforementioned modes in various combinations. As observed in FIG. 3, the DIMM card includes some associated logic circuitry that includes register space 310 that identifies which one of the modes the card is to be configured to operate in.

Figure 5:
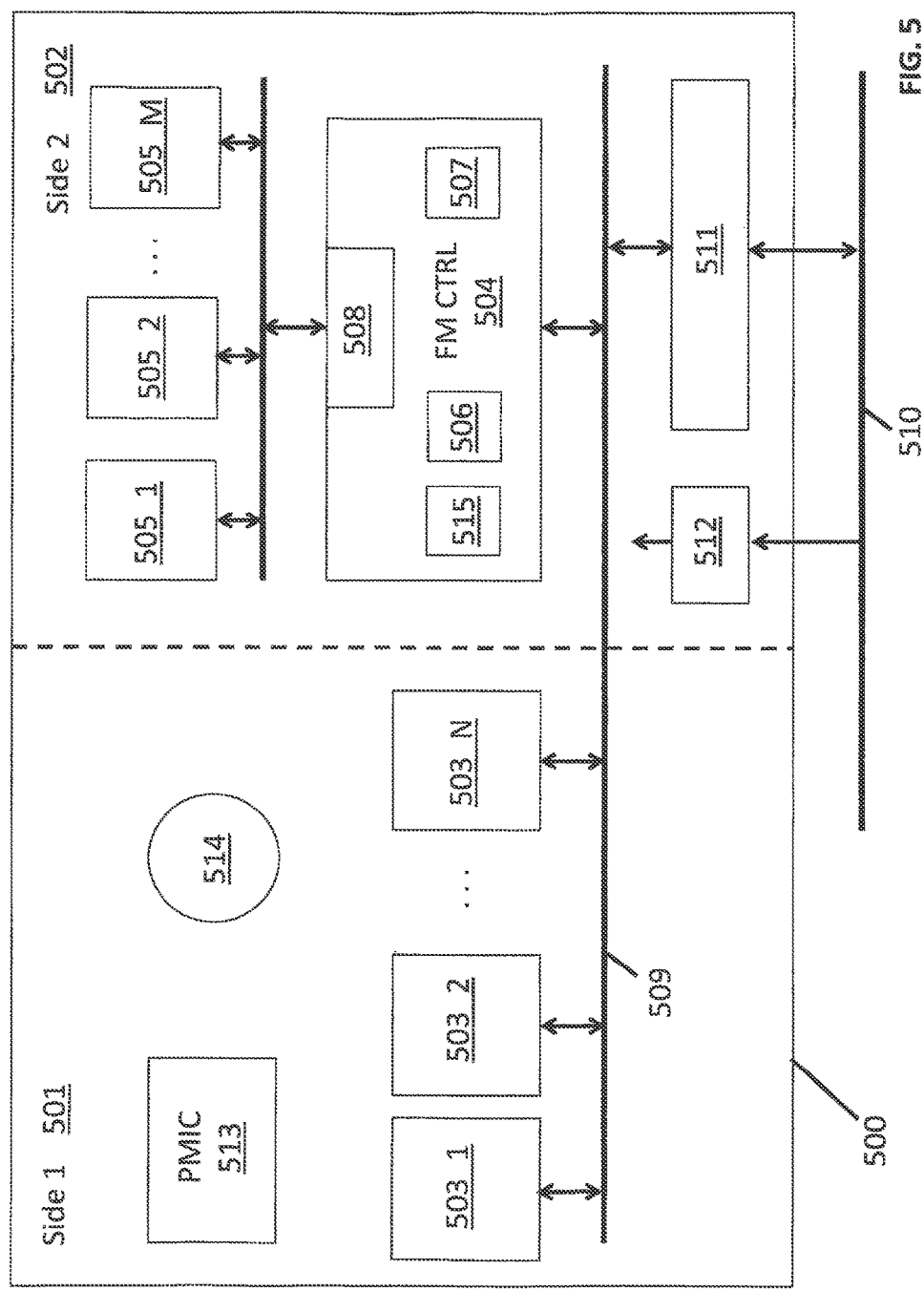
FIG. 5 shows a more detailed embodiment of the DIMM card of FIG. 3.

FIG. 5 shows a more detailed embodiment 500 of a design for the improved DIMM card 200 of FIG. 2. As observed in FIG. 5, one side 501 of the DIMM card (e.g., a front side) substantially includes the DRAM memory devices 503_1 through 503_N while the other side of the DIMM card (e.g., a back side) substantially includes the emerging non volatile random access memory devices 505_1 through 505_M.

As observed in FIG. 5, a non volatile memory controller 504 is also included on the DIMM card 500. The non volatile memory controller 504 is used, e.g., to implement wear leveling algorithms for the non volatile memory devices. Here, the storage cells of the non volatile memory devices that receive a higher rate of memory accesses may exhibit wear out of their data (their data becomes less reliable) before storage cells that receive a lesser rate of memory accesses. The wear leveling algorithm logic circuitry 506 is responsible for tracking which cells are receiving higher rates of accesses and which cells are receiving lesser rates of accesses and swapping the content of the cells at appropriate times (e.g., before the higher access rate cells exhibit wear out related data reliability problems).

The controller also includes address indirection table (AIT) logic 507 to map system memory addresses to specific cells within the non volatile memory devices 504_1 through 504_M. When data is swapped as a consequence of the wear leveling function, the AIT table 507 is updated to reflect which system memory addresses have had their content moved to which new non volatile memory location. Upon receipt of an incoming memory request, the system memory address of the request is used as a lookup parameter to the AIT 507 so the physical address of the cell within the non volatile memory where that system memory address's data is kept can be identified. The memory controller 504 also includes the aforementioned register space 515 that the system programs to inform the card as to which one of the different modes the card is to operate in.

The non volatile memory controller 504 also includes read and write circuitry 508 to read and write information from the non volatile memory devices 503_1 through 503_M. The presence of the read and write circuitry 508 within the non volatile memory controller 504 also permits for much faster transfer of information from the DRAM devices 503_1 through 503_N to the non volatile memory devices 505_1 through 505_M during a power down event.

Here, as observed in FIG. 5, the data bus 509 of the memory channel 510 that the DIMM card 500 plugs into both the non-volatile memory controller 504 and the DRAM devices 503_1 through 503_N. In an embodiment, the DRAM devices 503_1 through 503_N are designed to communicate with an industry standard double data rate (DDR) protocol over the data bus 509 and the non volatile memory controller 504 is designed to communicate over the same data bus 509 with a transactional protocol that uses many of the signals and pin-outs of the industry standard DDR protocol used by the DRAM devices 503_1 through 503_N. Embodiments of such a transactional protocol is described in U.S. Published Application No. 2014/0040550, entitled "Memory Channel That Supports Near Memory And Far Memory Access", published on Feb. 6, 2014 and assigned to the assignee of the instant application.

As observed in FIG. 5, the data bus 509 of the memory channel 510 is coupled to the DIMM card 500 through a bank of tri-state bi-directional transmitter/receiver buffers 511. The command signals of the memory channel are received through a bank of switches 512. Upon a sudden power down event that is detected by on board power management logic circuitry 513, the power management logic circuitry 513 will set the bi-directional buffers 511 into an open circuit to decouple the physical data bus of the memory channel 510 to the DIMM card 500 and open the switch 512 to physically decouple the command signal lines of the memory channel 510 from the corresponding signals on the DIMM card 500 (not shown for illustrative ease). The power control function will also decouple any supply voltages received from the slot (e.g., via other switches not shown in FIG. 5).

At this point the DIMM card 500 will be electrically isolated from the system and the card's on board power source 514 will supply the card. The power management logic circuitry 513 will next instruct the non volatile memory controller 504 to directly read information out of the DRAM devices 503_1 through 503_N and store the information into non volatile memory space 505.

Subsequently, after a detected power on is detected. The power management function 513 keeps the card isolated from the slot except for the supply voltages and instructs the non volatile memory controller 504 to read the saved DRAM information from non volatile memory space 505 and store it back into the DRAM devices 503_1 through 503_N.

Although embodiments above have emphasized a DIMM card in particular, it is pertinent to point out that the teachings above can be generally extended to any unit of memory and/or memory card.

The processes described above that are performed by the DIMM card alone may be performed: 1) with firmware that is stored on the DIMM card (and, e.g., executed by a micro-controller within the non volatile memory controller) or on the host side or some combination thereof; 2) in hardware (e.g., via a state machine circuit); or, 3) some combination of 1) and 2). Processes performed by the host or the host and DIMM card together may be performed in firmware (e.g., only host side firmware or some combination of host side firmware and card side firmware), hardware, software or some combination thereof.

Figure 6:
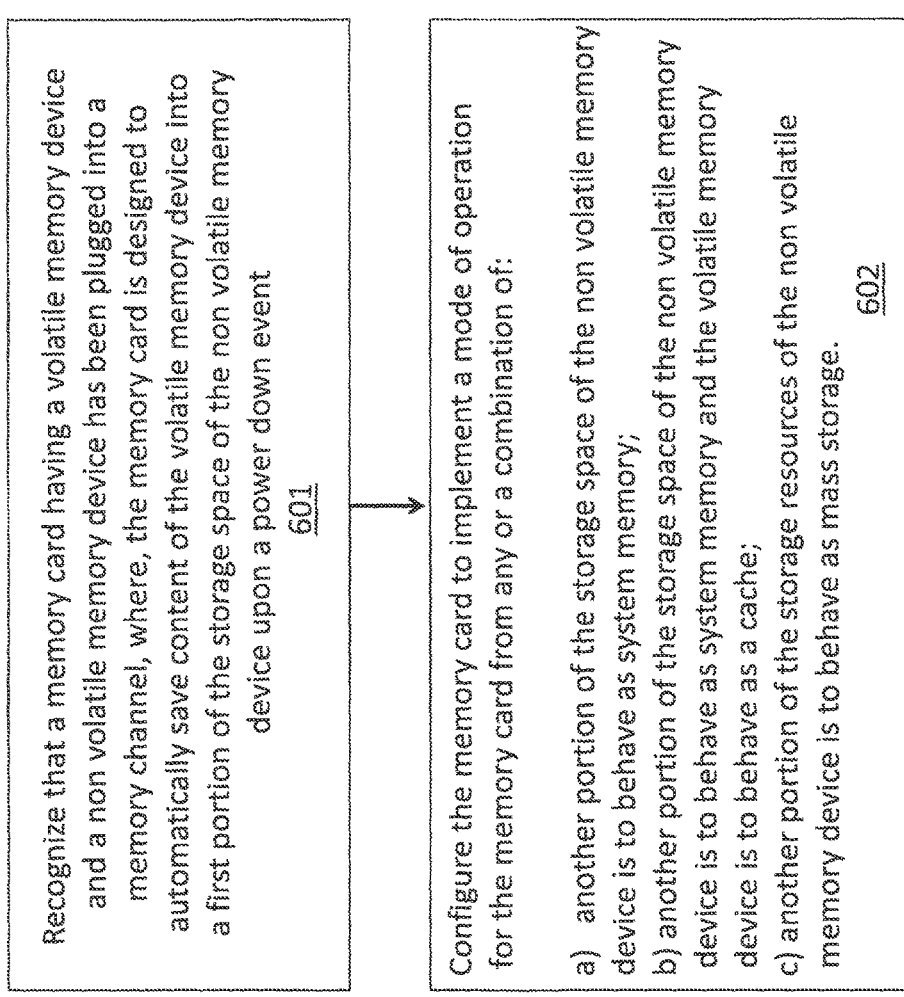
FIG. 6 shows a methodology performed by the DIMM card of FIG. 3.

FIG. 6 shows a method that may be performed, e.g., by configuration software of a host that has a memory card as described above plugged into one of its memory channels. As observed in FIG. 6, the method includes recognizing that a memory card having volatile memory devices and non volatile memory devices has been plugged into a memory channel 601, where, the memory card is designed to automatically save content of the volatile memory devices into a first portion of the storage space of the non volatile memory devices upon a power down event.

The method also includes configuring the memory card to implement a mode of operation 602 for the memory card from any or a combination of: a) another portion of the storage space of the non volatile memory devices is to behave as system memory; b) another portion of the storage space of the non volatile memory devices is to behave as system memory and the volatile memory devices are to behave as a cache; c) another portion of the storage resources of the non volatile memory devices is to behave as mass storage.

Figure 7:
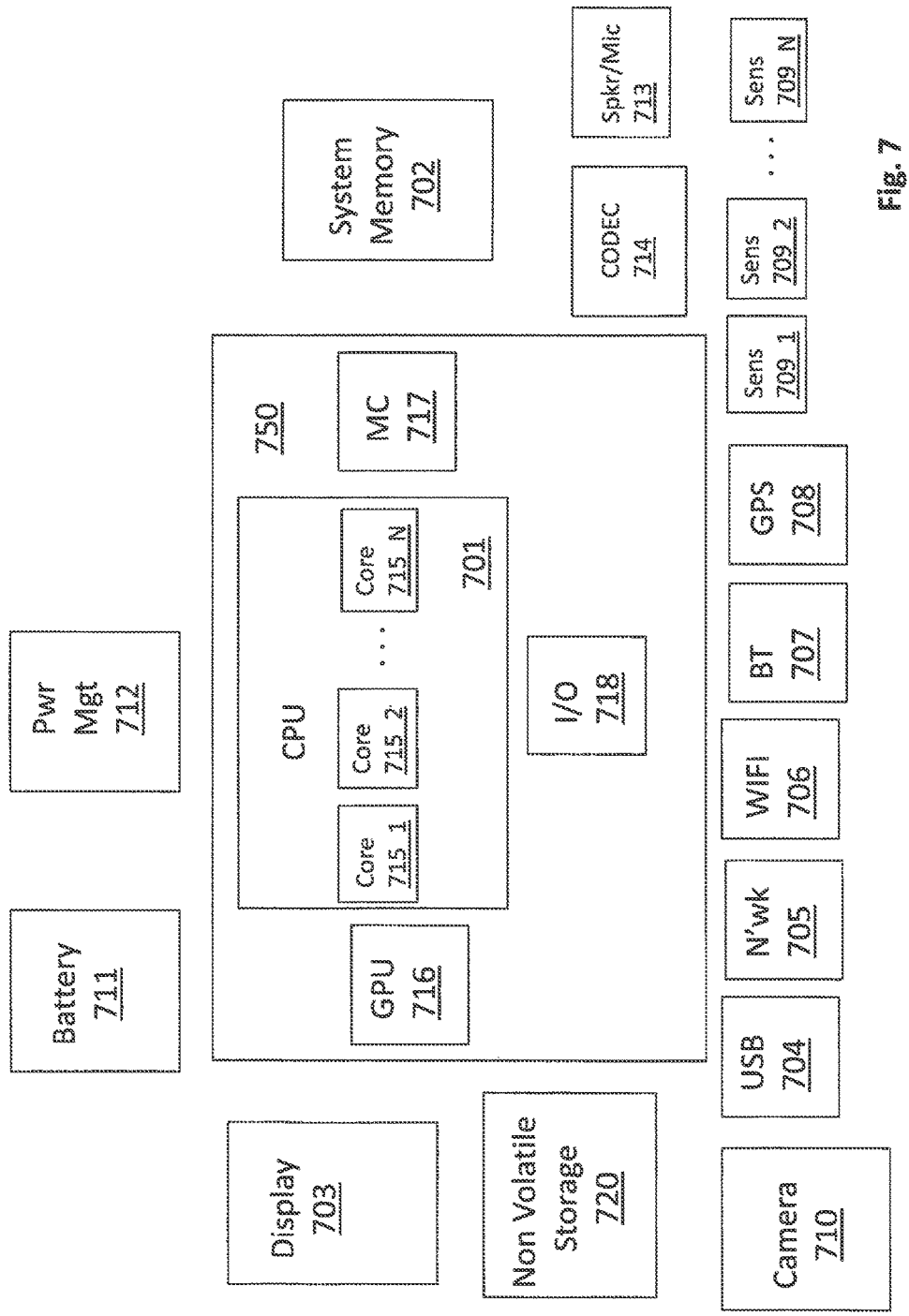
FIG. 7 shows an embodiment of a computing system.

FIG. 7 shows a depiction of an exemplary computing system 700 such as a personal computing system (e.g., desktop or laptop) or a mobile or handheld computing system such as a tablet device or smartphone, or, a larger computing system such as a server computing system. As observed in FIG. 7, the basic computing system may include a central processing unit 701 (which may include, e.g., a plurality of general purpose processing cores and a main memory controller disposed on an applications processor or multi-core processor), system memory 702, a display 703 (e.g., touchscreen, flat-panel), a local wired point-to-point link (e.g., USB) interface 04, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N (e.g., one or more of a gyroscope, an accelerometer, a magnetometer, a temperature sensor, a pressure sensor, a humidity sensor, etc.), a camera 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702. The system memory 702 may be a multi-level system memory such as the multi-level system memory discussed at length above. The system memory 702 and/or non volatile mass storage 720 may be implemented with a memory card that incorporates various aspects of the above provided teachings.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the camera 710). Depending on implementation, various ones of these I/O components may be integrated on the applications processor/multi-core processor 750 or may be located off the die or outside the package of the applications processor/multi-core processor 750.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising: a memory card, comprising:
   a) a volatile memory device;
   b) a non volatile memory device, the memory card comprising configuration circuitry to cause the memory card to implement a first portion of the storage space of the non volatile memory device as system memory;
   c) a controller to manage, upon a power down event, the transfer of information from the volatile memory device into a second portion of the storage space of the non volatile memory device.

2. The apparatus of claim 1 wherein the configuration circuitry is also to cause the memory card to implement the volatile memory device as system memory.

3. The apparatus of claim 2 wherein the configuration circuitry is also to cause the memory card to not use the first portion of the storage space of the non volatile memory device and implement the volatile memory device as system memory.

4. The apparatus of claim 1 wherein the configuration circuitry is also to cause the memory card to implement the first portion of the storage space of the non volatile memory device as mass storage.

5. The apparatus of claim 1 wherein the configuration circuitry is also to cause the memory card to implement the volatile memory device as a cache.

6. The apparatus of claim 5 wherein the configuration circuitry is also to cause the memory card to implement the volatile memory device as a cache for the first portion of the storage space of the non volatile memory device.

7. At least one machine readable medium containing program code that when processed by a computing system causes the computing system to perform a method, comprising:
recognizing that a memory card having a volatile memory device and a non volatile memory device has been plugged into a DDR memory channel, the memory card being designed to automatically save content of the volatile memory device into a first portion of the storage space of the non volatile memory device upon a power down event;
configuring the memory card to implement one of a plurality of modes of operation supported by the memory card, the plurality of modes of operation comprising:
   a) another portion of the storage space of the non volatile memory device is to behave as system memory;
   b) another portion of the storage space of the non volatile memory device is to behave as system memory and the volatile memory device is to behave as a cache, wherein, the cache is to behave as a cache for any of i), ii) and iii) below:
      i) another portion of the storage space of the non volatile memory device that is to behave as byte addressable system memory;
      ii) another memory card plugged into said DDR memory channel;
      iii) another memory card plugged into another memory channel; and,
   c) another portion of the storage space of the non volatile memory device is to behave as mass storage.

8. The machine readable medium of claim 7 wherein the DDR memory channel is part of a multi-level system memory.

9. The machine readable medium of claim 7 wherein the memory card comprises configuration circuitry to implement the volatile memory device as byte addressable system memory.

10. A computing system, comprising:
one or more processors;
a memory controller coupled to the one or more processors;
a memory channel coupled to the memory controller;
a memory card coupled to the memory channel, the memory card comprising:
   a volatile memory device;
   a non volatile memory device, the memory card comprising configuration circuitry to cause the memory card to implement a first portion of the storage space of the non volatile memory device as system memory;
   a controller to manage, upon a power down event, the transfer of information from the volatile memory device into a second portion of the storage space of the non volatile memory device.

11. The computing system of claim 10 wherein the configuration circuitry is also to cause the memory card to implement the volatile memory device as system memory.

12. The computing system of claim 11 wherein the configuration circuitry is also to cause the memory card to not use the first portion of the storage space of the non volatile memory device and implement the volatile memory device as system memory.

13. The computing system of claim 10 wherein the configuration circuitry is also to cause the memory card to implement the first portion of the storage space of the non volatile memory device as mass storage.

14. The computing system of claim 10 wherein the configuration circuitry is also to cause the memory card to implement the volatile memory device as a cache.

15. The computing system of claim 14 wherein the configuration circuitry is also to cause the memory card to implement the volatile memory device as a cache for the first portion of the storage space of the non volatile memory device.

16. The computing system of claim 10 wherein the memory channel is a component within a multi-level system memory.

17. The computing system of claim 10 wherein the non volatile memory device is implemented with one or more of:
   a phase change memory;
   a ferro-electric memory;
   a magnetic memory;
   a spin transfer torque based memory;
   a resistor memory;
   an Memristor memory;
   a universal memory;
   a programmable metallization cell memory;
   an amorphous cell memory;
   an Ovshinsky memory.

18. The computing system of claim 10 further comprising one or more of:
   a network interface communicatively coupled to the one or more processors;
   a battery communicatively coupled to the one or more processors; and,
   a display communicatively coupled to the one or more processors.

* * * * *